Figure 6:
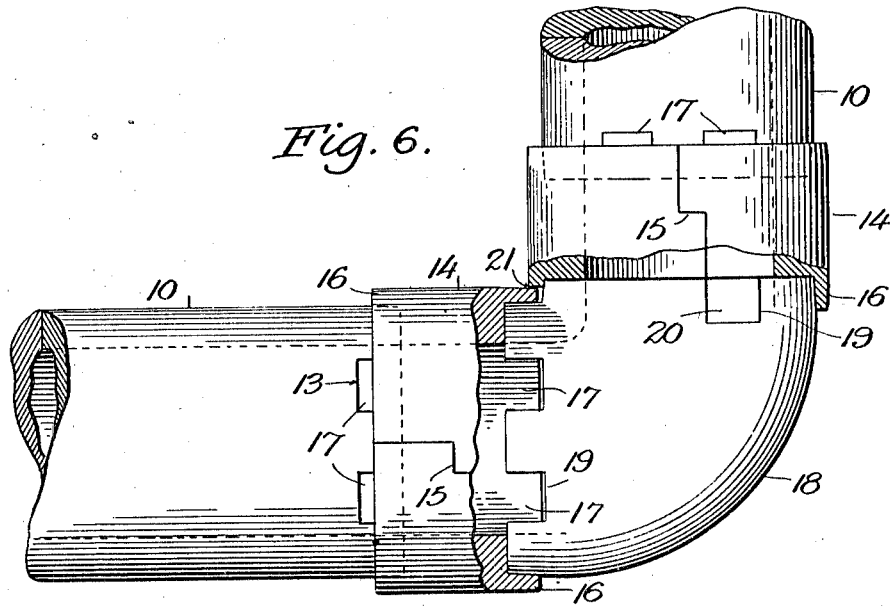

H. SCHAPERJAHN.
PIPE COVERING.
APPLICATION FILED MAR. 5, 1913.
1,105,844.
Patented Aug. 4, 1914.
2 SHEETS—SHEET 1.
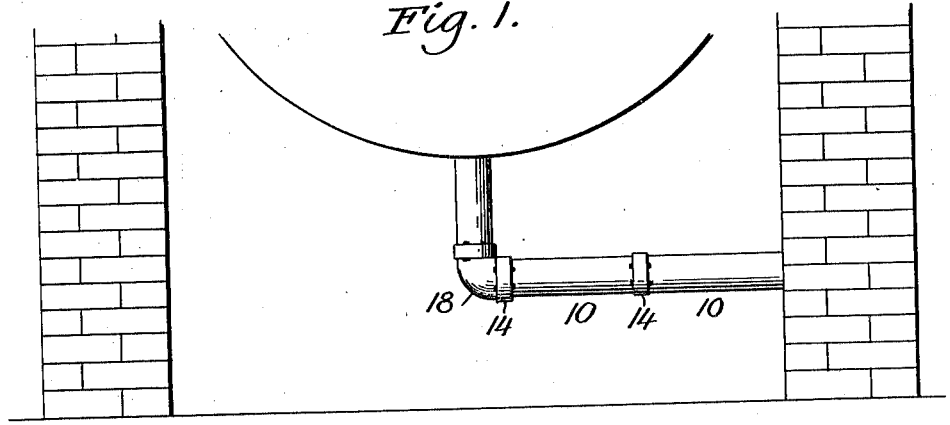
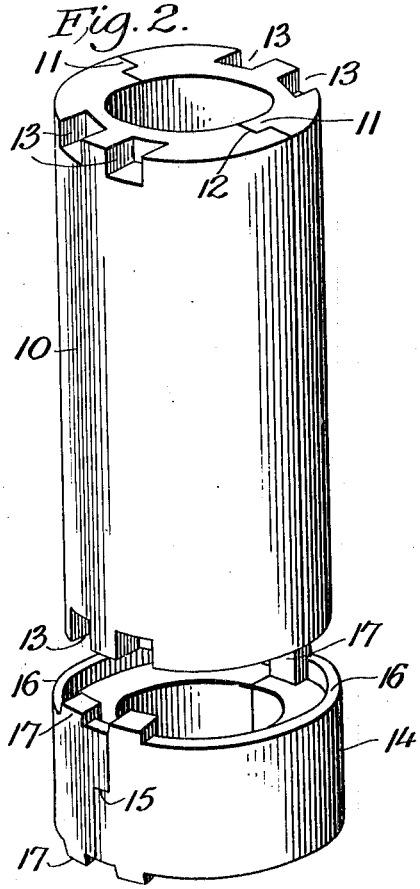
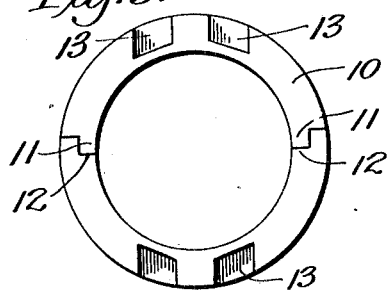
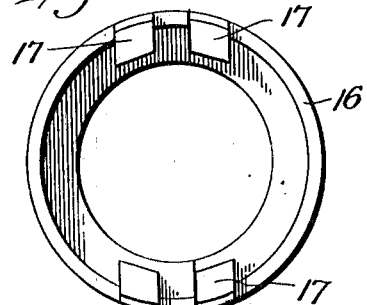
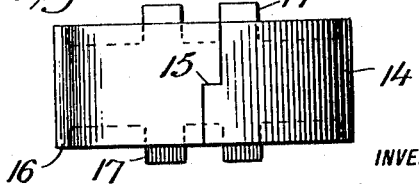
WITNESSES
Bernard Aeby
Julius H. Fritz
INVENTOR,
Herman Schaperjahn,
BY
James F. Duhamel.
ATTORNEY

H. SCHAPERJAHN.
PIPE COVERING.
APPLICATION FILED MAR. 5, 1913.

1,105,844.

Patented Aug. 4, 1914.

2 SHEETS—SHEET 2.

WITNESSES
Bernard Aebly
Juliette H. Fritz

INVENTOR,
Herman Schaperjahn.
BY
James P. Duhamel,
ATTORNEY

UNITED STATES PATENT OFFICE.

HERMAN SCHAPERJAHN, OF NEW YORK, N. Y.

PIPE-COVERING.

1,105,844.  Specification of Letters Patent.  Patented Aug. 4, 1914.

Application filed March 5, 1913. Serial No. 751,999.

*To all whom it may concern:*

Be it known that I, HERMAN SCHAPERJAHN, a citizen of the United States, and resident of New York, in the county of New York and State of New York, have invented certain new and useful Improvements in Pipe-Coverings, of which the following is a specification.

Figure 7:
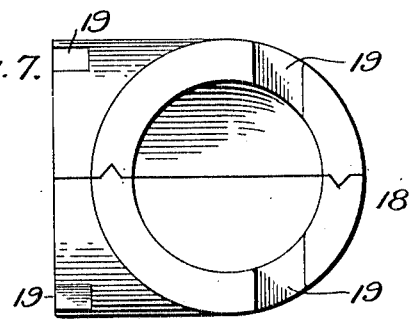
Figure 8:
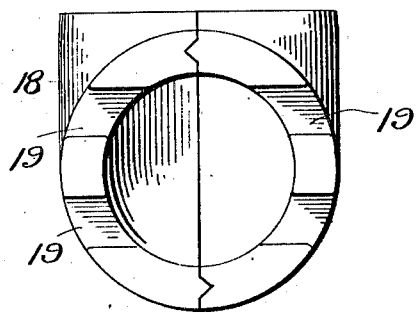
Figure 9:
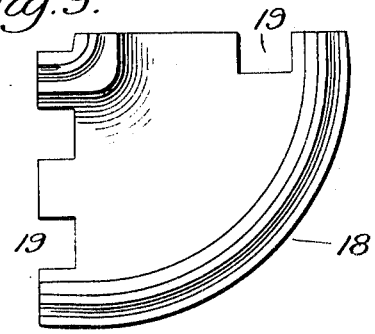

This invention relates to pipe covering and has for its object means for providing divided sections of non-conductive material connected by sleeves or rings also divided, the two members being connected by tenons and mortises and the dividing lines being at an angle to each other, as will be more fully described in the following specification, set forth in the claims and illustrated in the drawings accompanying this application and wherein:

Figure 1 shows the application of the covering to the blow out pipe of a steam boiler. Fig. 2 is a perspective view of a pipe section and a sleeve. Fig. 3 is an end view of the section. Fig. 4 is an end view of a sleeve. Fig. 5 is a side view of a sleeve. Fig. 6 is a side view partly broken away of the covering for an elbow and adjacent parts. Fig. 7 is a plan view of a complete elbow section. Fig. 8 is an end view of same. Fig. 9 is an inside view of an elbow section.

In the use of pipe covering when used to protect iron or steel pipes from excessive heat, or cold, or from gases and acids, great difficulty has been experienced in quickly and effectually applying the covering so that it could be retained in place when subjected to considerable wear and tear. It is often impossible to use metal clamps, and fastening means of the same non-conductive material are often bulky and ineffectual. To overcome these objections the present invention is provided with interlocking members to not only unite the sections at their ends but to hold the sides of the sections together.

The covering is molded from suitable material and the sections 10 are divided longitudinally with inner tongues 11 and chambers 12 to form a close joint and prevent air or moisture from reaching the inclosed pipe. At each end of the section and on each side are sockets 13 of any desired number and size but preferably in pairs and diametrically opposite on the outer face of the sections. The sections are joined by interposed sleeves 14 also divided longitudinally but the dividing line is off-set as at 15 to prevent the sections from being dislocated longitudinally. The sleeve is of greater diameter than the pipe sections so that it may be provided with a flange 16 to close the joints between the sections and the sleeves and above the ends of the sleeve and the flanges extend tenons 17 to enter mortises or sockets 13. When the sleeves and sections are thus put together the dividing lines are at right angles to each other and the two members are holding their respective parts together and locking them about the pipe in such a manner that it would necessitate the destruction of the covering to remove it and at the same time the locking means is so substantial as to hold the covering snugly about the pipe, and prevent it sagging. The elbow and similar sections 18 are similarly made in two parts and have mortises 19 to receive the tenons 17 from the sleeves 14. The dividing line of the two elbow parts is also at right angles to the dividing line of the sleeve and when these two sections are placed together the tenons not only lock the sleeve parts to make them practically one but the flanges 16 hold the elbow portions together.

As will be seen in Figs. 6 and 7 one end of the elbow section has but one set of mortises and the sleeve for the same has similar coöperating tenons 20. The flange of this sleeve is also cut away as at 21 to fit over the flange of the adjacent sleeve and make a good joint. The inner joints of the sleeves and elbows may also be provided with tongues and grooves to more thoroughly close their joints.

When the sections, the elbows and the sleeves are put in place and substantially locked by the tenons the dividing joints may be pointed up with suitable cement and all cracks and openings effectually closed at the same time more thoroughly securing the parts together and making a solid covering for the pipe.

It is obvious that these coverings may be of any desired material or size or shape but the tongues, grooves mortises and tenons may be otherwise arranged or modified without departing from the essential features above described or from the scope of the appended claims.

What I claim as new and desire to secure by Letters Patent is:

1. In pipe covering, cover sections divided longitudinally and having tongues and sockets so disposed as to enable the adjacent sections to lock their divided parts together.

2. In pipe covering, cover sections divided longitudinally and having tongues and sockets to enable the adjacent sections to lock their parts together with the dividing lines at right angles to each other.

3. In pipe covering, the combination with cover sections divided longitudinally and having recesses, of collars divided longitudinally and having tongues for the recesses and adapted to connect the adjacent sections and lock them together with the dividing lines at right angles, and flanges on the collars to cover the ends of the sections.

4. In pipe covering, the combination with cover sections divided longitudinally and having recesses at their ends, of collars divided longitudinally and adapted to receive the ends of the sections and having tongues to enter the recesses and lock the collars and sections together with their lines of division at right angles.

Signed at New York in the county of New York and State of New York this 24th day of February A. D. 1913.

HERMAN SCHAPERJAHN.

Witnesses:
 JAMES F. DUHAMEL,
 W. E. LAWSON.